(12) United States Patent  (10) Patent No.: US 7,095,920 B1
Little  (45) Date of Patent: Aug. 22, 2006

(54) BROADBAND OPTICAL VIA

(75) Inventor: Brent E. Little, Columbia, MD (US)

(73) Assignee: Little Optics Inc, Annapolis Junction, MD (US)

( * ) Notice: Subject to any disclaimer, the term of this patent is extended or adjusted under 35 U.S.C. 154(b) by 64 days.

(21) Appl. No.: 10/776,706

(22) Filed: Feb. 11, 2004

Related U.S. Application Data

(60) Provisional application No. 60/446,612, filed on Feb. 11, 2003.

(51) Int. Cl.
  *G02B 6/26* (2006.01)
  *G02B 6/12* (2006.01)
(52) U.S. Cl. ............... 385/30; 385/14; 385/131
(58) Field of Classification Search ........... 385/14, 385/30, 43, 50, 130, 131
  See application file for complete search history.

(56) References Cited

U.S. PATENT DOCUMENTS

| | | | |
|---|---|---|---|
| 3,663,194 A | 5/1972 | Greenstein et al. | |
| 3,785,717 A | 1/1974 | Croset et al. | |
| 4,070,516 A | 1/1978 | Kaiser | |
| 4,472,020 A | 9/1984 | Evanchuk | |
| 5,159,699 A * | 10/1992 | de Monts | 385/14 |
| 6,236,786 B1 | 5/2001 | Aoki et al. | |
| 6,253,009 B1 * | 6/2001 | Lestra et al. | 385/50 |
| 6,385,376 B1 * | 5/2002 | Bowers et al. | 385/50 |
| 6,650,817 B1 | 11/2003 | Murali | |
| 6,724,968 B1 * | 4/2004 | Lackritz et al. | 385/131 |
| 6,785,449 B1 * | 8/2004 | Lee et al. | 385/50 |
| 6,819,853 B1 * | 11/2004 | Lam et al. | 385/131 |
| 6,987,913 B1 * | 1/2006 | Blauvelt et al. | 385/50 |
| 2005/0025408 A1 * | 2/2005 | McIntyre et al. | 385/14 |

* cited by examiner

*Primary Examiner*—Rodney Bovernick
*Assistant Examiner*—Omar Rojas

(57) ABSTRACT

A broadband optical via provides a low loss interconnection between waveguides in two vertically adjacent planar waveguiding layers. Two waveguides, one in each planar layer, evanescently interact over an interaction length, and substantially all of the power on one waveguide is transferred to the second waveguide. The relative detuning between waveguides is varied along the interaction region by tapering the width of one or both guides along the direction of propagation. The interaction strength is also varied by varying the physical separation between the two waveguides such that the interaction approaches zero near the two ends of the interaction length. The performance of the broadband optical via is fabrication tolerant, polarization tolerant, wavelength tolerant, and dimensionally tolerant.

12 Claims, 8 Drawing Sheets

| Top-Down | Lateral Cross-Section | Longitudinal Cross-Section |

| Top-Down | Lateral Cross-Section | Longitudinal Cross-Section |

| Top-Down | Lateral Cross-Section | Longitudinal Cross-Section |

BROADBAND OPTICAL VIA

CLAIM TO PRIORITY

Applicants hereby claim priority under all rights to which they are entitled under 35 U.S.C. Section 119 based upon the Provisional Application Ser. No. 60/446,612 for this patent application filed at the United States Patent and Trademark Office on Feb. 11, 2003.

BACKGROUND OF THE INVENTION—FIELD OF INVENTION

This invention relates to a method and structure for interconnecting two integrated optical waveguides that lie in different vertical planes within a multilayer optical circuit. More specifically it relates to an optical via that transfers optical power from one waveguide to a vertically adjacent waveguide, the power transfer being fabrication tolerant, polarization tolerant, wavelength tolerant, and dimensionally tolerant.

BACKGROUND OF THE INVENTION

Planar optical circuits are comprised of optical waveguides and devices that confine light to propagate primarily along a two-dimensional plane. Light is confined by an optical waveguide. The waveguide is comprised of a core having a certain refractive index, and a cladding surrounding the core on all sides. The cladding can be different on the top, sides, and bottom of the core, but at all locations it will have a refractive index that is lower than the refractive index of the core. The plane of propagation is parallel to the substrate on which the dielectric layers comprising the waveguides are fabricated. It is possible to have numerous planar layers each having waveguides vertically positioned or stacked one on top of the other. This increases integration densities. These stacked layers are often called multilayer optical circuits, or vertically integrated circuits.

Vertical integration is often used in silicon electronics both for device layers and for electrical interconnect (wiring) layers. Electrical signals can be routed from one layer to another layer by the use of electrical vias, which are electrical connections in the vertical direction. For an electrical via to work properly, it is sufficient to have low resistance electrical connectivity between the layers through the via.

Optical vias, which transfer optical signals between adjacent planes, are not straight forward. Unlike electrical vias, it is not sufficient to have a continuity of optical core material for the photons to follow, because photons do not behave like electrons (which simply follow a path of least resistance). Photons can not go around right angle turns without significant scattering loss.

A planar optical waveguide circuit comprised of two guiding layers is depicted in FIGS. 1A to 1C. FIGS. 1A to 1C show three different cross sections of a portion of the optical waveguide circuit. FIG. 1A shows a top down schematic view pointing out the two waveguides (110, 111) that are on different planar layers. FIG. 1B shows a lateral cross section of the structure, which in general comprises two waveguide cores (110,111), a substrate (116), a lower cladding (115), a buffer layer between the two planar light guiding cores (113), a top cladding (112) and cladding around the two light guiding cores (114, 112). FIG. 1C shows a longitudinal cross section schematic of a portion of a two-layer optical circuit. Circuits similar to FIGS. 1A to 1C, having one or multiple layers, are called "planar circuits" because propagation takes place mainly in a plane. The various waveguides in different vertical planar layers do not interact except when they are close enough such that the optical modes supported by the waveguides can interact with each other. This interaction range is usually limited to a distance smaller than several optical wavelengths. The interaction is often called "evanescent" interaction because the evanescent fields of the modes supported by the waveguides interact. By extension, multilayer circuits are similar to those in FIG. 1, having multiple guiding layers surrounded by cladding layers, and adjacent guiding layers separated by buffer layers.

An optical via is a structure that allows passage of an optical signal from one plane to another with low loss. One method to accomplish this is the vertical directional coupler shown in FIGS. 2A to 2C. FIGS. 2A to 2C are similar to FIGS. 1A to 1C, in that the structure described has two vertical waveguiding planar layers that are separated by a buffer layer. FIGS. 2A to 2C describes a specific two layer optical circuit called a vertically coupled directional coupler. In this case two waveguides in two planes are parallel to each other and directly above one another. The waveguides co-propagate together over some length. They are close enough so that the optical fields or modes in the two waveguides can interact evanescently. If the waveguides have identical propagation constants, also called synchronous, they will exchange full power over a certain length called the beat length. The beat length is a function of various geometrical waveguide parameters such as index, geometric dimensions, and buffer layer thickness. The beat length is also a function of wavelength and polarization. If the length of interaction is longer than a beat length, power that has been coupled from one waveguide to another will couple back into the first waveguide, which is undesirable. If the length of interaction is shorter than a beat length, full power transfer will not be achieved. It is therefore essential to correctly design the directional coupler to be exactly one beat length long at the wavelength of interest. The directional coupler type of via is simple and short. Its drawbacks are that it is wavelength and polarization sensitive and it is sensitive to all fabrication imperfections that cause the two waveguides to not be identical, (such as changes in index, dimensions, or buffer layer thickness).

BACKGROUND OF THE INVENTION—PRIOR ART

U.S. Pat. No. 3,785,717 to M. Croset et al. describes a multilayer optical circuit comprised of directional couplers, similar to FIGS. 2A to 2C. The directional couplers are used to transfer optical power between layers. The difficulty of directional couplers are that they are very fabrication sensitive and also naturally wavelength dependent or narrow band, and polarization dependent. The method specifically described in U.S. Pat. No. 3,785,717 is also only limited to diffused type waveguides, which are no longer used in state of the art optical circuits.

U.S. Pat. No. 4,472,020 to V. L. Evanchuk et al. describes a method for making monolithic circuits having waveguides on multiple layers. The method mainly pertains to fabrication methods to realize multilayer structures. Via like structures are discussed for the transfer of optical power between layers, and these structures amount to corner reflectors or mirrors. In practice, integrated optic corner reflectors and mirrors are very difficult to fabricate and are inherently very lossy. This loss can not be overcome easily. Further, corner reflectors and mirrors need very high index contrast materials, or metallic layers which are inherently absorptive.

U.S. Pat. No. 6,236,786 to H. Aoki et al. describes a dual layer optical circuit where the two layers are connected by a through hole. As in U.S. Pat. No. 4,472,020 discussed above, corner reflectors or mirrors are used to transfer power between the two layers, using the through hole as a vertical light pipe to confine the light as it traverses from one layer to the other. In practice these structures are very lossy, especially for single mode waveguides, and required fabrication methods that are unconventional, and therefore not suitable for mass production.

U.S. Pat. No. 3,663,194 to B. Greenstein et al. describes multilayer optical circuits. Although the invention teaches methods to realize multilayer circuits, these multilayers do not communicate with one another. Rather they are independent.

U.S. Pat. No. 4,070,516 to H. D. Kaiser describes a multilayer optical circuit and module. As in U.S. Pat. No. 4,472,020 discussed above, corner reflectors, mirrors, and right-angle bends are described for use in coupling the multilayers and changing the direction of the light signal in each layer. To date, such mirrors and corner reflectors have not shown promise in practice, and therefore, other means must be invented. Further, light can not fundamentally be guided around a right-angle bend without loss and scattering. Photons, unlike electrons, can not be induced to follow right angle bends.

U.S. Pat. No. 6,650,817 to V. Murali describes a multi-level waveguide. The waveguides on multi-levels are interconnected by etching holes from one layer to another and these holes filled with optically transparent and optically guiding material. This method uses unconventional fabrication methods and is unsuitable for volume manufacturing. Further, as in earlier cited prior art above, light is forced to be guided around right-angle bends, which fundamentally are not low loss.

None of the prior art provides for efficient low loss power transfer between optical waveguides in a multilayer optical circuit. This invention discloses, for the first time, an efficient optical via that provides for low loss, fabrication tolerant, and broad wavelength usage power transfer structure to connect optical waveguides on different layers of a multilayer optical circuit.

DETAILED DESCRIPTION OF THE INVENTION

Figure 1A:
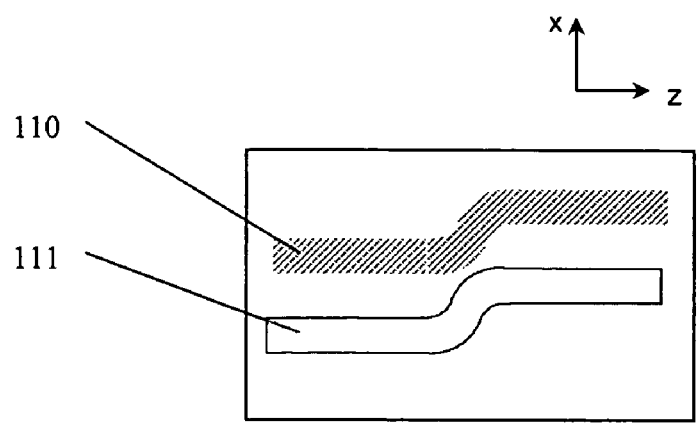
FIG. 1A shows a top down schematic view of a portion of multilayer optical circuit.
Figure 1B:
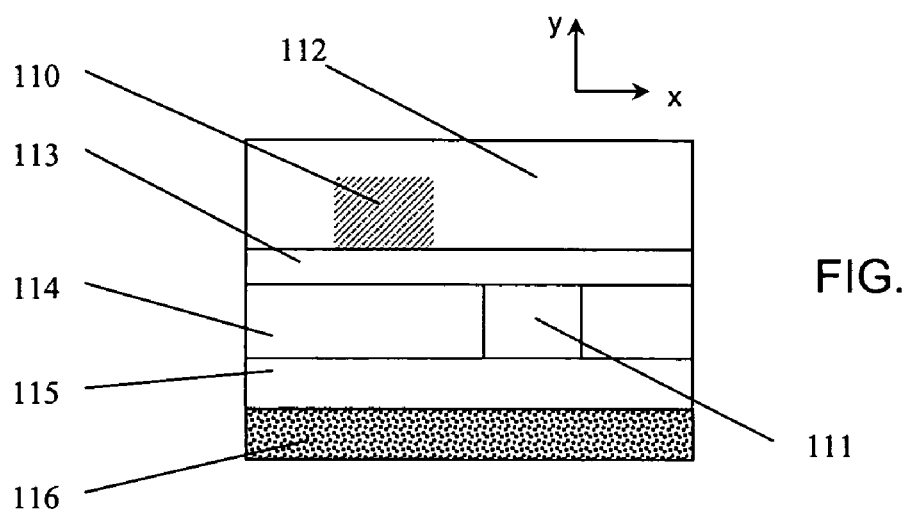
FIG. 1B shows a lateral cross section schematic view of a portion of a multilayer optical circuit.
Figure 1C:
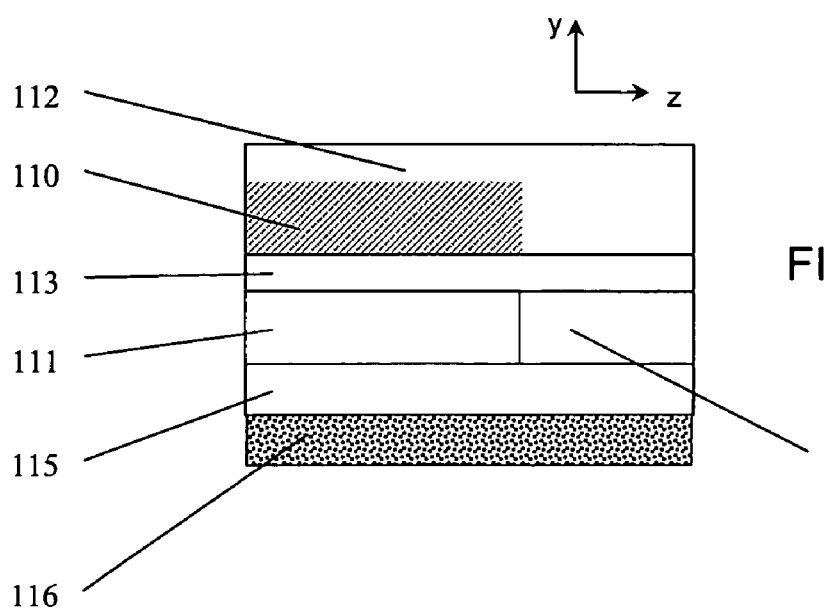
FIG. 1C shows a longitudinal cross section schematic view of a portion of a multilayer optical circuit.
Figure 2A:
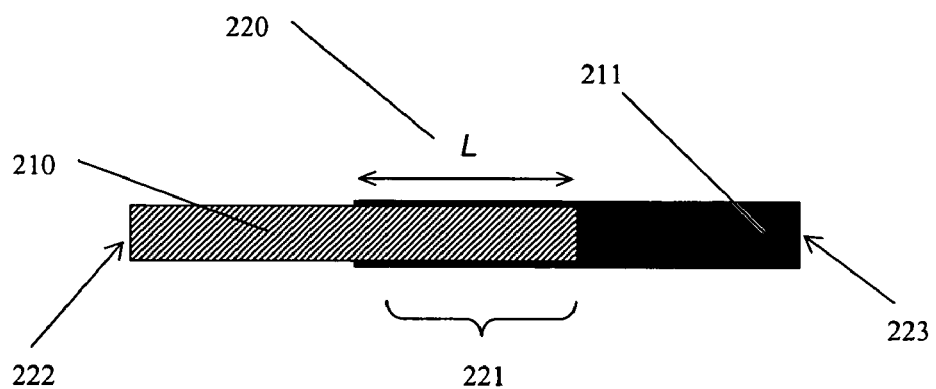
FIG. 2A shows a top down schematic view of a vertically coupled directional coupler.
Figure 2B:
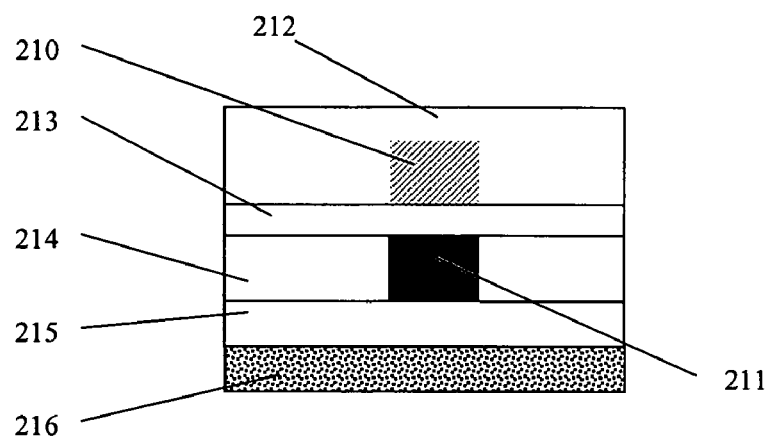
FIG. 2B shows a lateral cross section schematic view of a vertically coupled directional coupler.
Figure 2C:
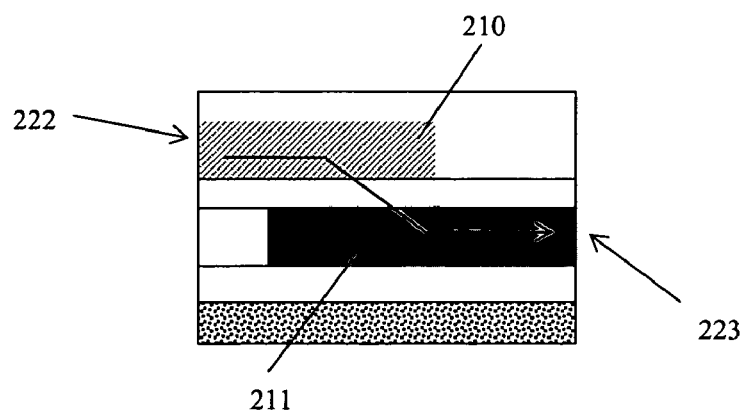
FIG. 2C shows a longitudinal cross section schematic view of a vertically coupled directional coupler.

We describe here the general principle of the broadband, fabrication insensitive optical via. The via is based on the directional coupling between two waveguides situated on two vertically positioned layers, as previously described in conjunction with FIG. 2. However, in the present case the coupling strength between the two waveguides, and the relative detuning in the propagations constants, or equivalently the effective indexes, are varied as a function of propagation distance in a prescribed manner. The resulting structure is longer than the simple beat-length uniform directional coupler, but is more insensitive to exact length, wavelength, index variations, geometrical dimensions and polarization.

Figure 3A:
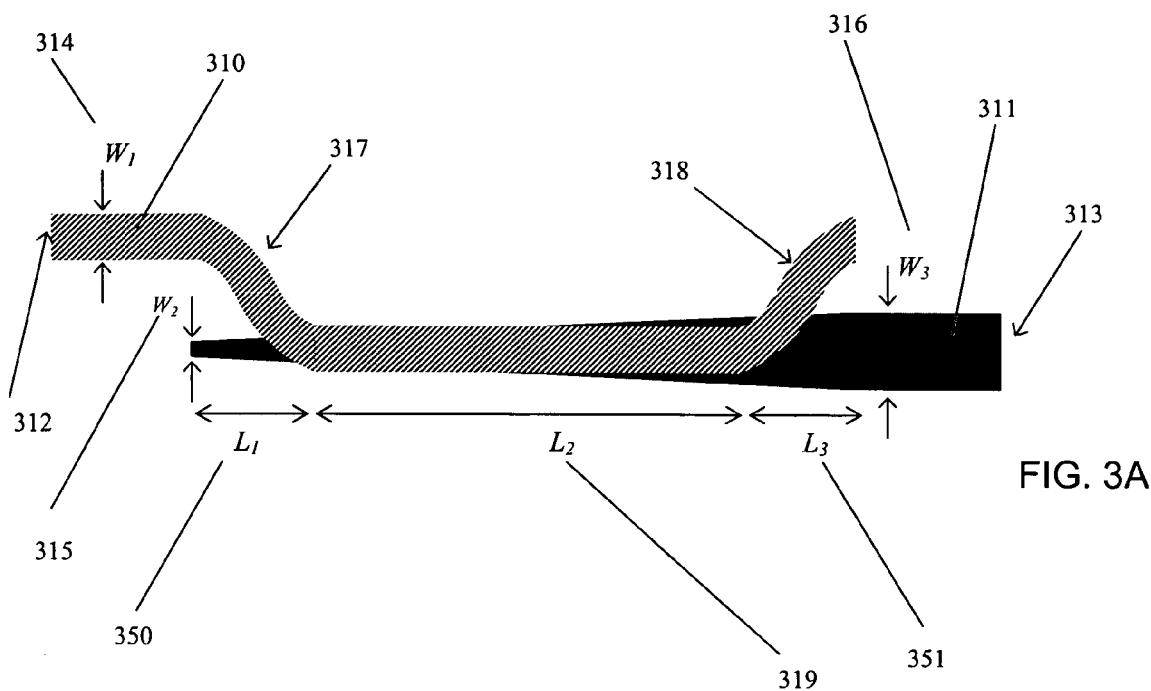
FIG. 3A shows a top down schematic view of a broadband optical via.
Figure 3B:
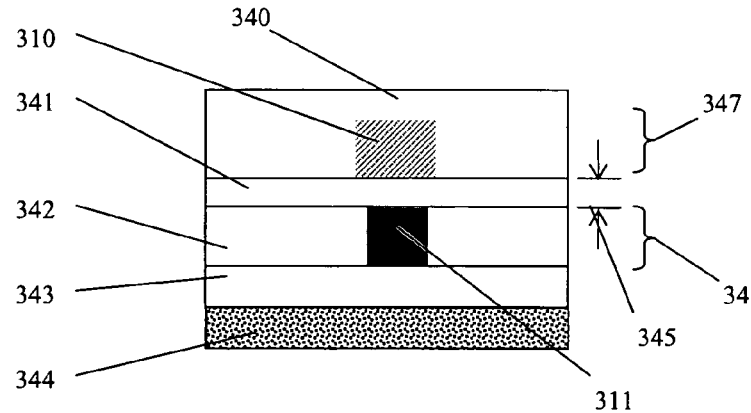
FIG. 3B shows a lateral cross section schematic view of a broadband optical via.
Figure 3C:
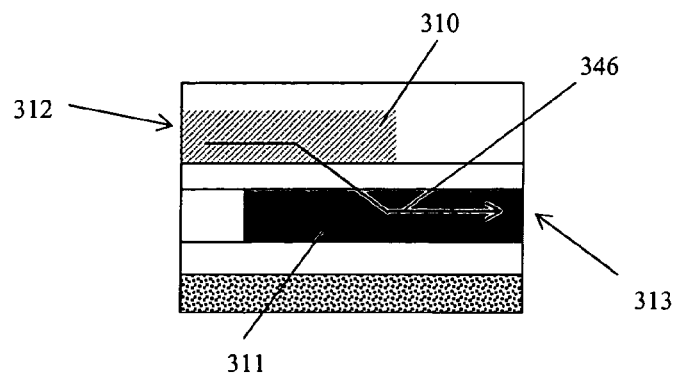
FIG. 3C shows a longitudinal cross section schematic view of a broadband optical via.

FIGS. 3A to 3C show schematic views of the broadband optical via invention. FIG. 3A shows a top-down schematic view of the broadband optical via. Two shaped waveguides on two different layers comprise the optical via. Waveguide 1 (310) is on planar layer 1 (347) and Waveguide 2 (311) is on planar layer 2 (348). Layer 2 can be physically above or below layer 1. An incident optical signal from other parts of the optical circuit is incident on the input (312) of Waveguide 1. FIG. 3B shows a lateral cross section schematic view of the via. A buffer layer (341) separates the two waveguiding layers. The thickness of this buffer layer will be labeled "t" (345). The optical circuit including the optical via may be fabricated on a substrate (344) that additionally includes a lower cladding layer (343), a top cladding layer (340) that surrounds Waveguide 1, and cladding that surrounds Waveguide 2 (342). By extension, there may be more than two waveguiding layers with buffer layers separating the guiding layers and optical vias that interconnect the various layers. FIG. 3C shows a longitudinal cross section schematic view of the broadband coupler. The function of the optical via is to transfer the entire signal in at the input of Waveguide 1 (312) to the output of Waveguide 2 (313), or vise versa, as shown by the arrow in FIG. 3C representing optical flow (346). Initially Waveguide 1 and Waveguide 2 are displaced laterally by a distance large enough such that they do not evanescently interact. Waveguide 1 is then curved by some general input S-Bend (317 in FIG. 3A) such that it overlaps vertically with Waveguide 2. The S-bend is not so abrupt that it causes bending or scattering loss. In Referring to FIG. 3A, the input S-Bend (317) occurs over a length $L_1$ (350). Waveguide 1 and Waveguide 2 then remain in close proximity and parallel to each other over some propagation distance $L_2$ (319). After the distance $L_2$ Waveguide 1 is again curved away from Waveguide 2 by an output S-Bend (318), and the S-Bend occurs over a length $L_1$ (351) such that Waveguides 1 and 2 are separated sufficiently far away from each other that they do not interact. Waveguide 1 can be terminated at this point (but does not need to be). Throughout the optical via, Waveguide 1 has a fixed width $W_1$ (314). Throughout the interaction region Waveguide 2 is linearly tapered in width. The narrow end of the taper is towards the input side, while the wider end is towards the output side. Waveguide 2 is linearly tapered in such a way that the waveguide starts with a width of $W_2$ (315) and ends with a width of $W_3$ (316). After the via section, Waveguide 2 can be again tapered to some other desired width, such as tapering to a width with dimension $W_1$. The length over which Waveguide 2 is tapered must be larger than $L_2$, but can be less than $L_1+L_2+L_1$. At the start of section $L_2$, Waveguide 2 must have a width that is smaller than Waveguide 1. At the end of section $L_2$, Waveguide 2 must have a width that is larger than Waveguide 1.

Figure 4A:
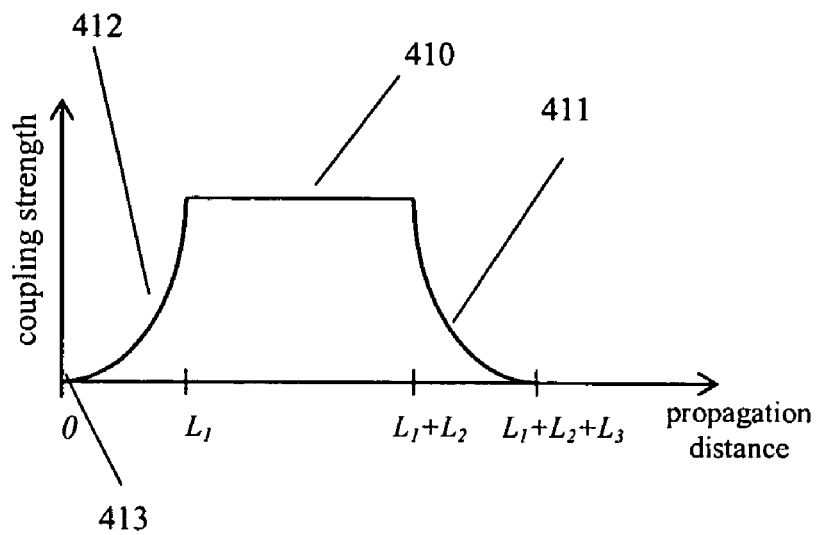
FIG. 4A depicts the waveguide-to-waveguide interaction strength along the length of the broadband optical via.
Figure 4B:
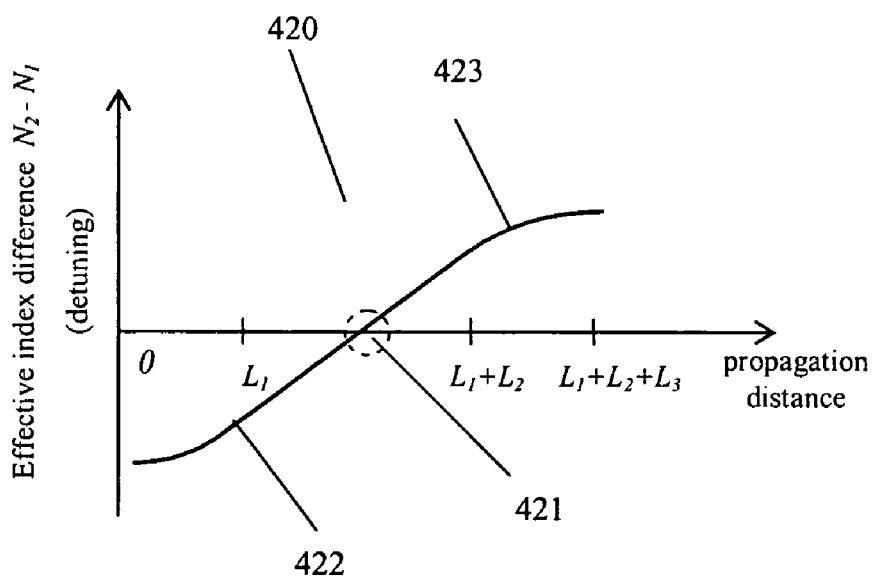
FIG. 4B depicts the waveguide-to-waveguide effective index detuning along the length of the broadband optical via.
Figure 5A:
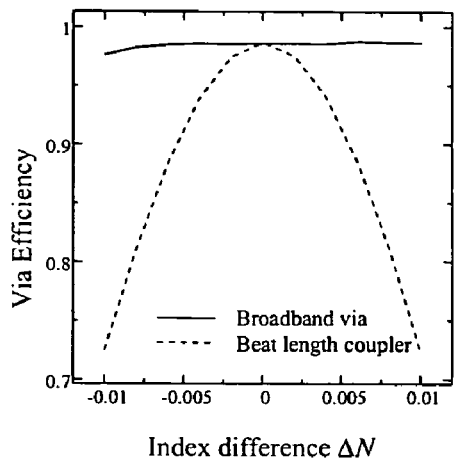
FIG. 5A depicts the robustness of the broadband optical via to deviations in the index difference between the two waveguides of the via structure.
Figure 5B:
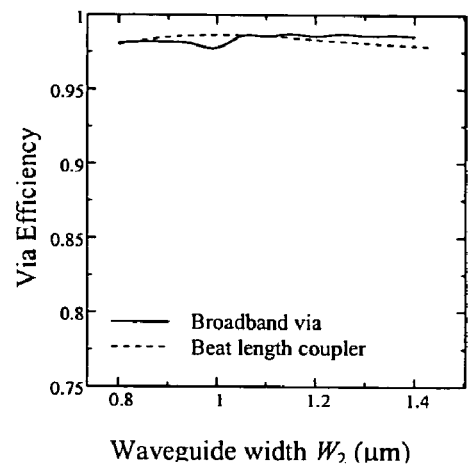
FIG. 5B depicts the robustness of the broadband optical via to deviations in waveguide width of one of the waveguides comprising the optical via.
Figure 5C:
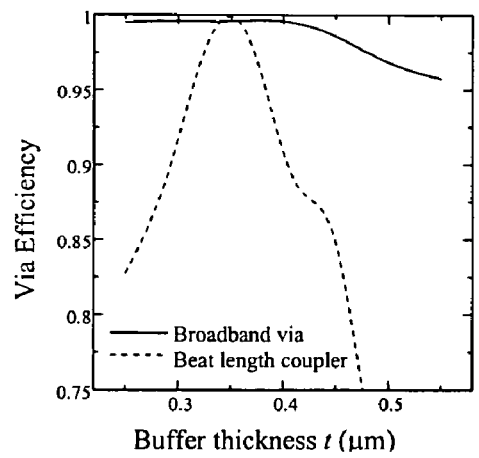
FIG. 5C depicts the robustness of the broadband optical via to deviations in the vertical waveguide to waveguide buffer distance.
Figure 5D:
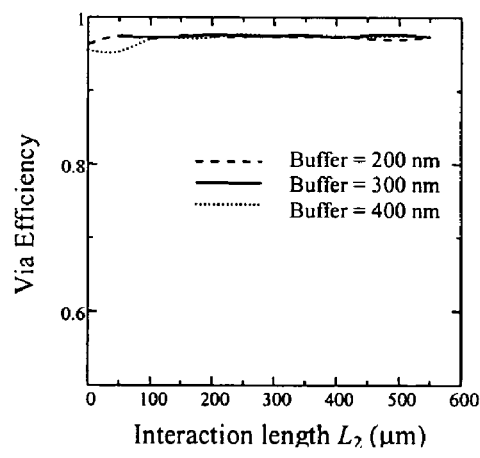
FIG. 5D depicts the robustness of the broadband optical via to deviations in the overall length of the optical via.

Another way to describe the optical via is in terms of the coupling strength between the two vertically coupled waveguides, and the difference between the modal effective indexes, both as a function of propagation distance along the via. FIG. 4A shows the coupling or interaction strength between Waveguide 1 and Waveguide 2 of the optical via of FIG. 3, as a function of distance along the optical via. It shows qualitatively how the coupling strength should vary along the optical via. Referring to FIG. 4A, at the input end of the optical via (413) the coupling is small or negligible. Over the first S-Bend section, Waveguides 1 and 2 approach each other and the coupling strength increases (412). Over the section of length $L_2$, the waveguides are positioned directly over one another and the coupling is strong and constant (410). Over the second S-Bend region, the waveguides are separated from each other and the coupling strength goes to zero (411). By the term "sufficiently far apart so as to not interact" we mean that the coupling strength is negligible for all practical purposes. FIG. 4B shows the difference in modal effective indexes between Waveguides 1 and 2 of the optical via of FIG. 3 as a function of propagation distance (420). The difference between the effective indexes is also termed the "detuning". The notation $N_1$ and $N_2$ are used to describe the modal effective indexes of Waveguide 1 and Waveguide 2 respectively. Near the center of the optical via, the effective indexes are identical ($N_2-N_1=0$) (421). We call this the synchronous condition. In the first portion of the via (422), the effective index of Waveguide 2 is smaller than that of Waveguide 1, and hence $N_2<N_1$. In the second portion of the optical via (423), the situation is reversed and the effective index of Waveguide 2 is larger than that of Waveguide 1. The difference in effective indexes varies smoothly along the via.

The description of the optical via in terms of position dependent coupling strength and detuning is very useful because it describes the essence of the optical via without the need to specify the structure or geometry. Several different structures and geometries can result in a similar performing optical via. The structure and geometry are consequences of trying to achieve the desired coupling and detuning profiles. For instance, in order to achieve a smoothly varying detuning, Waveguide 2 is tapered, and to first order a linear taper leads to a linear detuning. It is likewise possible to taper Waveguide 1. Likewise, it is desirable to achieve a smoothly varying coupling strength, and this is achieved by varying the separation between the two waveguides.

It should be noted that the optical via does not require precisely linear tapers of the waveguides, or constant coupling strength throughout the middle of the coupler. However, for descriptive purposes, and sometimes for fabrications purposes, linear tapers are simpler, but not required.

The optical via is bidirectional. Referring to FIG. 3A, an optical signal incident at the input of Waveguide 1 (312) on Layer 1 will exit the output of Waveguide 2 (313) on Layer 2. Reversing the direction, an optical signal that is incident on the "output" Waveguide 2 on Layer 2, will be output at the "input" of Waveguide 1 in Layer 1.

It will be apparent to those skilled in the art, that the forgoing specific geometry for the optical via is one of a number of configurations that would lead to the same result. For instance, the S-bends on Waveguide 1 (317, 318) in FIG. 3 could be put on Waveguide 2. Similarly, the taper on Waveguide 2 can be placed on Waveguide 1, or simultaneously on Waveguides 1 and 2, but with tapers in opposite directions. Such modifications, that lead to similarly functioning optical vias, and are based on the same physics described in conjunction with FIG. 4 are to be considered equivalent embodiments of the spirit of this invention.

An example of a realized broadband optical coupler is now described. A broadband optical via similar to the structure with respect to FIG. 3 was analyzed and fabricated. Referring to FIG. 3, Waveguide 1 and Waveguide 2 had identical nominal core refractive indexes of 1.70. The cladding index surrounding both cores on the sides, the top, the bottom, and the buffer layer in between was 1.45. The waveguides were both 1.5 μm thick. The buffer layer had a thickness of t=350 nm. Waveguide 1 had a width of 1.1 μm and was constant along the via length. Note that a vertically coupled directional coupler having two identical waveguides with the foregoing geometry would have a beat length of 54 μm. A Broadband Optical Via was designed with the following parameters, referring to FIG. 3 again: $W_1=1.1$ μm, $W_{2=0.5}$ μm, $W_{3=1.7}$ μm, $L_1=150$ μm, $L_2=350$ μm, and the guides are separated by 2 μm (center—center) before and after the optical via. FIG. 5 compares the optical via efficiency for (a) deviations in refractive index between the guides, (b) variations in waveguide widths, (c) variations in vertical coupling thickness, and (d) variations in coupling length $L_2$. Clearly, the Broadband optical via is more robust to fabrication deviations compared to the simple beat-length directional coupler.

The foregoing Broadband optical via device was experimentally fabricated using silicon oxynitride as the core material and silica as the claddings. The insertion losses of straight waveguides were compared to those having two consecutive Broadband optical vias (forming a bridge). It was found that the Broadband optical vias introduced less than 0.1 dB of excess insertion loss, and the insertion loss did not vary over the wavelength from 1510 nm to 1620 nm. Hence the optical via is broadband.

Method of Fabrication

One method of fabricating multi-core layer devices (also called vertically coupled structures) is described in the sequence of steps illustrated in FIG. 6. The three columns in FIG. 6 show the top down view, the lateral cross section view, and the longitudinal cross section view. The longitudinal cross section is along the center axis of the waveguide. There are some novel fabrication steps, as well as some more conventional steps. Details of conventional fabrication techniques may be found in Hiroshi Nishihara, Masamitsu Haruna, Toshiaki, Suhara, "Optic integrated circuits" McGraw-Hill, 1985. Other methods of fabricating multi-layer circuits include B. E. Little et. al. "Vertically coupled glass microring resonator channel dropping filters," IEEE Photonics Technology Letters, vol. 11, pp. 215–217, 1999, and P. P. Absil et. al. "Vertically coupled microring resonators using polymer wafer bonding," IEEE Photonics Technology Letters vol. 13, pp. 49–51, 2001.

Figure 6A:
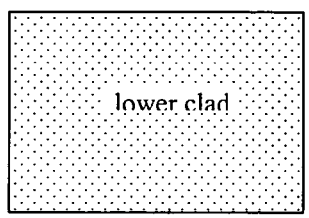
FIG. 6 describes fabrication steps for realizing multi-layer optical circuits and broadband optical vias.
Figure 6A:
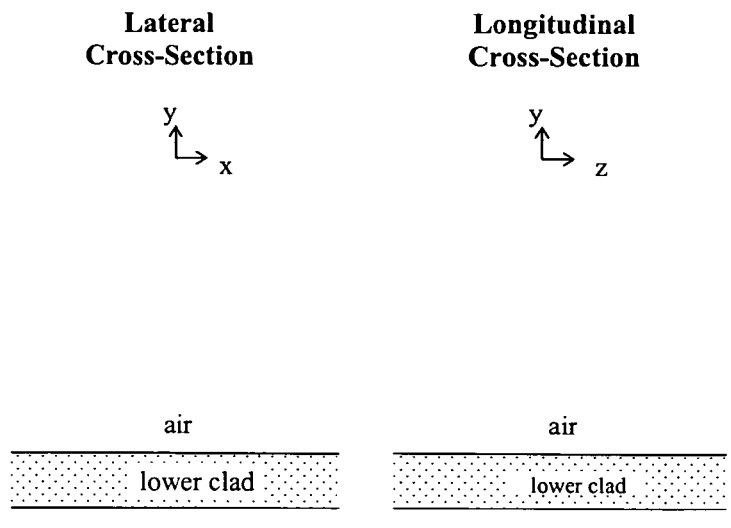

Step 1, FIG. 6A, A substrate wafer is chosen as a carrier onto which various dielectric layers will be deposited or grown. Common substrates include silicon, quartz, and Indium Phosphide. Often, a lower cladding material is deposited or grown on the substrate for the purpose of acting as a lower cladding or buffer to shield the optical mode from the substrate. A typical buffer layer on silicon is silicon dioxide. The first step in FIG. 6 shows a cross section of a wafer with a lower clad. The lower clad is typically 3 μm to 15 μm thick.

Figure 6B:
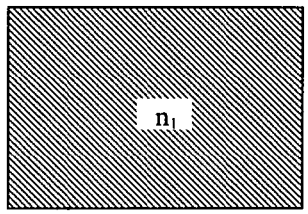
Figure 6B:
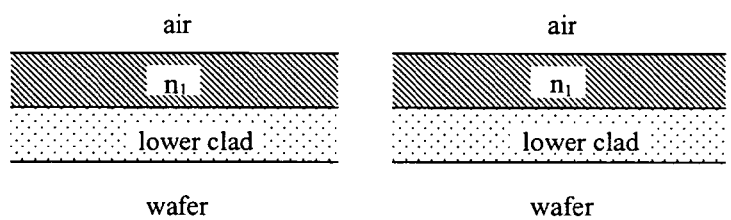

Step 2, FIG. 6B. The core layer of the first waveguide is deposited as a thin film. Common deposition techniques include chemical vapor deposition (CVD), sputtering, epitaxial growth, and spin on glasses or polymers. Common materials that form the core are doped silica, silicon, silicon nitride, silicon oxynitride, compound glasses, spin on glass, optical polymers, and quaternary compounds such as Aluminum-Gallium-Arsenide-Phosphide. The amount of material deposited is determined by design requirements, and is well controlled in the deposition steps. The second step in FIG. 6 shows a cross section of the chip with a thin film layer of core material used for the waveguide. In the present invention, the core is silicon oxynitride with $n_1=1.70$.

Figure 6C:
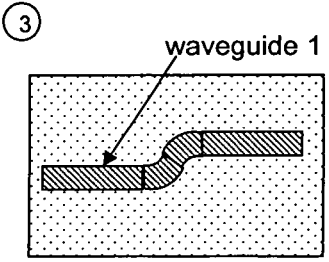
Figure 6C:
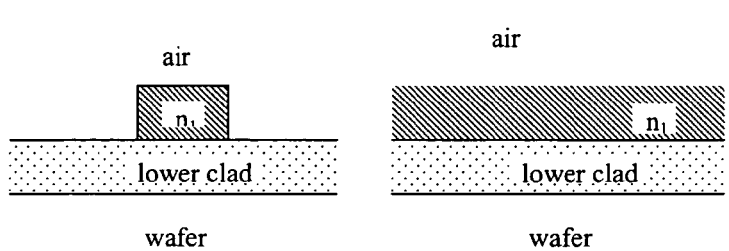

Step 3, FIG. 6C. Photoresist is spun onto the wafer, and the optical circuit layout is photographically patterned into the photoresist. The pattern comes from a design mask that is used as a photographic plate. The design includes any tapering or bends within the waveguides. The photoresist pattern is transferred into the core layer by standard etching techniques that use the photoresist as a mask. Etching techniques include chemical wet etching or reactive ion etching. After pattern transfer, the remaining photoresist is striped away, leaving a ridge or strip of core material that forms the first core of the optical circuit. The third step in FIG. 6 shows a cross section of the chip after the thin film layer has been etched, and the photoresist has been striped off.

Figure 6D:
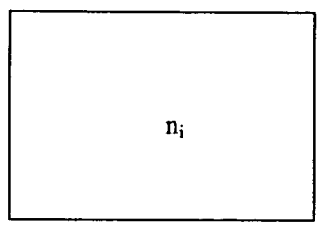
Figure 6D:
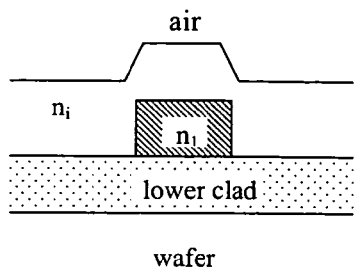
Figure 6D:
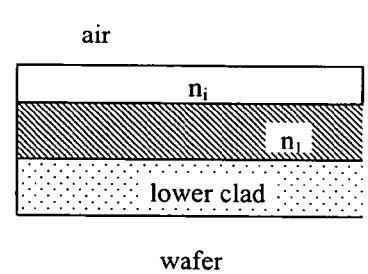

Step 4, FIG. 6D. An intermediate cladding material is deposited or grown on the surface of the wafer covering the first waveguide to a thickness greater than the core depth. This material can be any described in the previous steps, but will have an index that is lower than that of the first core layer (that is $n_1<n_1$). Because of the topography, the top surface of this layer may not be planar. For example, there may be a ridge over the waveguide, as depicted in step 4 of FIG. 6. Step 4 in FIG. 6 shows a cross section of the chip after top cladding material has been deposited over the wafer.

Figure 6E:
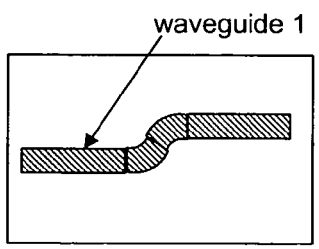
Figure 6E:
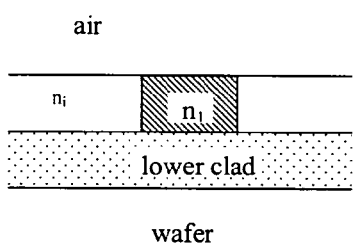
Figure 6E:
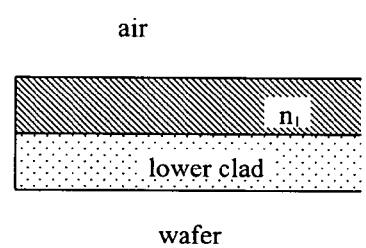

Step 5, FIG. 6E. It is desired to have the first waveguide encapsulated in the cladding material on all sides, except for the top surface of the waveguide. Therefore, the cladding that was deposited in step 4 must be removed down to a thickness of the first waveguide height, and must be planarized to give a flat surface across the chip or wafer. The top cladding can be planarized by well known techniques such as etch back and/or polishing. A planar buffer layer is then regrown. The fifth step in FIG. 6 shows a cross section of the chip after planarization down to the top surface of the first waveguide.

Figure 6F:
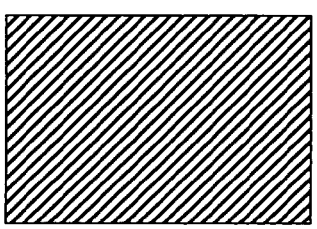
Figure 6F:
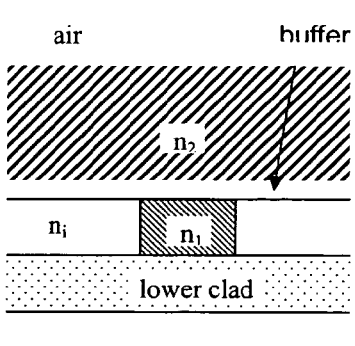
Figure 6F:
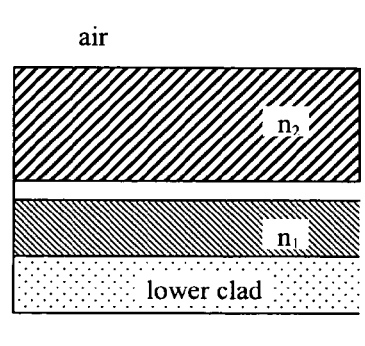

Step 6, FIG. 6F. Similar to step 2, material is deposited or grown over the surface of the wafer. This material will comprise the second core layer, and will have a refractive index of $n_2$. Any of the foregoing materials discussed in the previous steps may comprise this second core layer. In general, the index of this material will be close t, the index of the first waveguide. Step 6 of FIG. 6 shows a cross section of the chip after the second core layer is deposited.

Figure 6G:
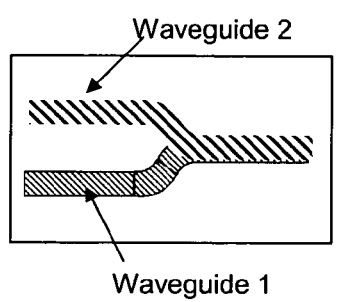
Figure 6G:
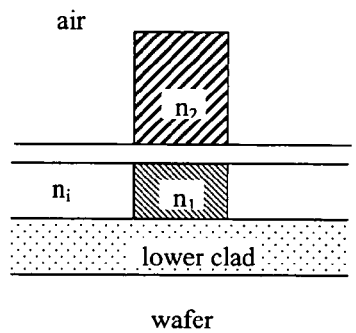
Figure 6G:
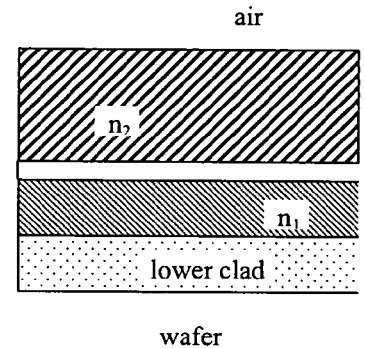
Figure 6H:
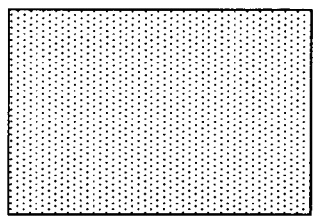
Figure 6H:
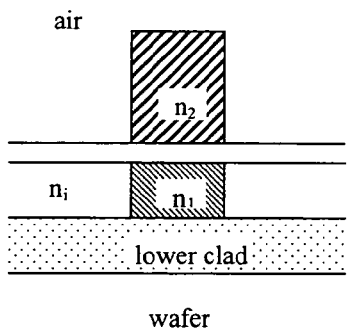
Figure 6H:
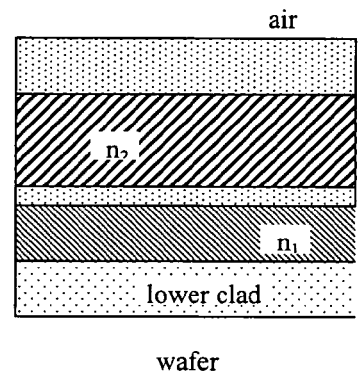

Step 7, FIG. 6G. Similar to step 3, photoresist is spun onto the wafer, and the second core layer is photographically patterned. The pattern is transferred to the second core layer by etching the material. The photoresist is striped away, and the result are ridges that are now the second core layer, and which lie directly above the first core layer. Any tapering within the mode transformer section for the second core are on the lithographic mask. Step 7 in FIG. 6 shows a cross section of the chip after material for the second core layer has been etched, and the photoresist has been striped.

Step 8, FIG. 6AH. Finally, cladding material is deposited over the entire wafer. Step 8 in FIG. 6 shows a cross section of the wafer with a top cladding layer deposited over the entire surface. The surface of the top layer may or may not be planar. If a planar surface is desired, planarization techniques similar to those described in Step 5 may be used. Steps 1 to 7 can be repeated to add additional core layers.

While the preferred embodiments have been described, it will be apparent to those skilled in the art that various modifications may be made to the embodiments without departing from the spirit of the present invention. Such modifications are within the scope of this invention.

I claim:
1. An optical via comprising:
   (a) a first waveguide in a first planar layer, said first waveguide having a first refractive index value and an input end, and supporting an optical mode with a first effective index value,
   (b) a second waveguide in a second planar layer, said second waveguide having a second refractive index value and an output end, and supporting a second optical mode with a second effective index value,
   (c) said first mode of first waveguide and said second mode of second waveguide evanescently interacting over an interaction length, and
   (d) means for adjusting the magnitude of said mode-to-mode evanescent interaction, adjusting the detuning between said effective indexes of said first and second modes, and adjusting said interaction length, in such a way as to effect broadband and substantially complete optical power transfer from said input end of the first waveguide to said output of the second waveguide;
   wherein the optical via introduces less than 0.1 dB of excess loss in a band of wavelengths between 1510 nm and 1620 nm.

2. The optical via of claim 1 wherein said first refractive index value and said second refractive index value are substantially the same.

3. The optical via of claim 1 wherein said means of adjusting the magnitude of waveguide-to-waveguide interaction comprises adjusting the physical separation between said first waveguide and said second waveguide.

4. The optical via of claim 1 wherein said means of adjusting the detuning between effective indexes of first and second modes comprises means for changing the waveguide width of said first waveguide or said second waveguide or both waveguides along said interaction length.

5. The optical via of claim 4 wherein said means of changing the width of said first waveguide or said second waveguide consists of tapering the waveguide dimension linearly from input end to output end over said interaction length.

6. The optical via of claim 1 wherein said first and second waveguides are planar waveguides fabricated from one or more of doped silica, germanium doped silica, Silicon, Silicon Nitride, Silicon Oxynitride, Silicon Oxycarbide, Indium Gallium Arsenide Phosphide, polymers, Lithium Niobate, or Tantalum Oxide.

7. A means for optically connecting two waveguides on two different planar layers by an optical via comprising
   (a) providing a first waveguide in a first planar layer, said first waveguide having a first refractive index value and an input end, and supporting an optical mode with a first effective index value,
   (b) providing a second waveguide in a second planar layer, said second waveguide having a second refractive index value and an output end, and supporting a second optical mode with a second effective index value,
   (c) providing a region where said mode of the first waveguide on the first layer evanescently interacts with said mode of the second waveguide on the second layer over an interaction length, and
   (d) means for adjusting the magnitude of said mode-to-mode evanescent interaction, adjusting the detuning between said effective indexes of said first and second modes, and adjusting said interaction length, in such a way as to effect broadband and substantially complete optical power transfer from said input end of the first waveguide to said output end of the second waveguide; wherein the optical via introduces less than 0.1 dB of excess loss in a band of wavelengths between 1510 nm and 1620 nm.

8. The optical via of claim 1 wherein said first refractive index value and said second refractive index value are substantially the same.

9. The optical via of claim 7 wherein said means of adjusting the magnitude of waveguide-to-waveguide interaction comprises adjusting the physical separation between said first waveguide and said second waveguide.

10. The optical via of claim 7 wherein said means of adjusting the detuning between effective indexes of first and second modes comprises means for changing the waveguide width of said first waveguide or said second waveguide or both waveguides along said interaction length.

11. The optical via of claim 10 wherein said means of changing the width of said first waveguide or said second waveguide consists of tapering the waveguide dimension linearly from input end to output end over said interaction length.

12. The optical via of claim 8 wherein said first and second waveguides are planar waveguides fabricated from one or more of doped silica, germanium doped silica, Silicon, Silicon Nitride, Silicon Oxynitride, Silicon Oxycarbide, Indium Gallium Arsenide Phosphide, polymers, Lithium Niobate, or Tantalum Oxide.

* * * * *